Aug. 22, 1967  O. W. BURKE, JR  3,337,299
SILICA PIGMENTS AND PROCESS FOR PRODUCING SAME
Filed May 24, 1965
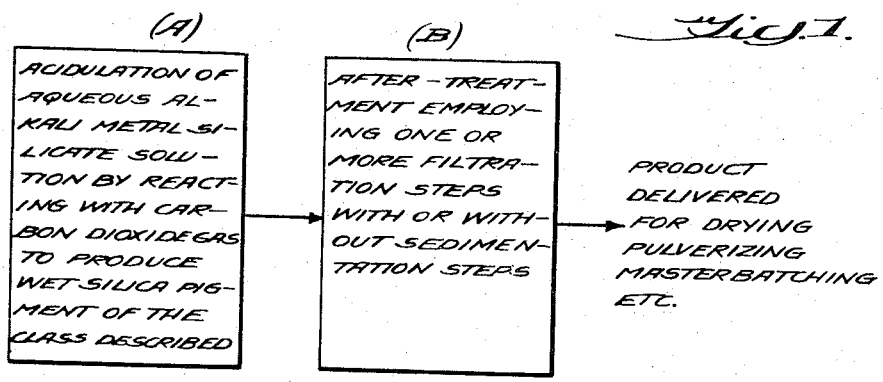
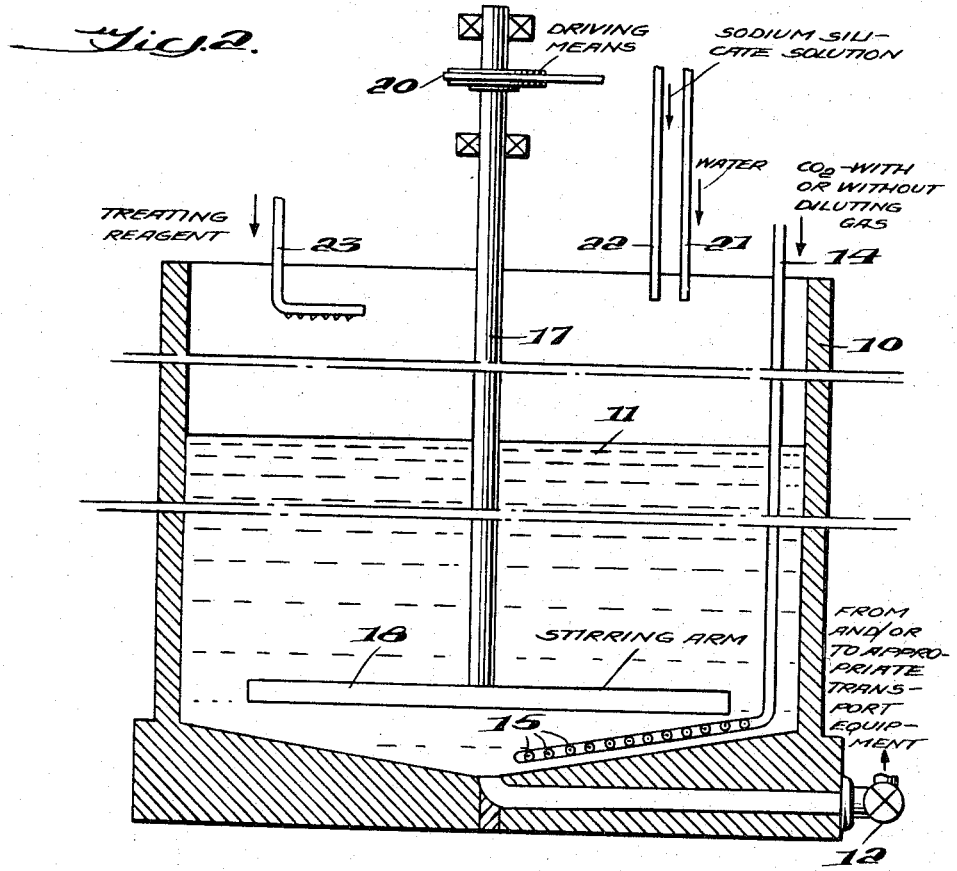
INVENTOR
OLIVER W. BURKE, JR,
BY
ATTORNEY

3,337,299
SILICA PIGMENTS AND PROCESS FOR PRODUCING SAME
Oliver W. Burke, Jr., Fort Lauderdale, Fla.
(P.O. Box 1266, Pompano Beach, Fla. 33061)
Filed May 24, 1965, Ser. No. 458,131
9 Claims. (Cl. 23—182)

The invention herein disclosed and claimed relates to the production of silica pigments from an aqueous solution of alkali metal silicate, and aims particularly to produce wet silica pigments having improved characteristics.

Particular objects of the invention, severally and interdependently, are to provide a wet silica pigment product having improved characteristics of filterability and to provide new and useful processes for the production thereof.

Further objects and advantages of the invention will be apparent from the following general and specific descriptions of preferred embodiments of the invention considered in connection with the accompanying drawings wherein:

FIG. 1 is a typical flow sheet of the main procedures generally employed in the production of silica pigment via the acidulation of an aqueous alkali metal silicate solution and the subsequent handling and treatment of the wet silica pigment slurry produced by such acidulation, and FIG. 2 is a more or less diagrammatic representation, partly in vertical section, of various features of apparatus which may be employed in applying the present invention to such processes.

The invention resides in the novel products and in the new and useful process features herein disclosed, and is more particularly pointed out in the appended claims.

*General description*

Wet silica pigments of the class precipitated from aqueous sodium silicate solution with the aid of carbon dioxide for the preparation of finely divided particulate silica pigment for the reinforcement of rubber, inter alia, are subjected to various after-treatment before drying and micropulverizing, e.g. washing and treatment with various chemical modifiers such as acid or metal salts, and such after-treatments generally include the subjecting of the slurry to one or more filtration steps with or without sedimentation steps.

The silica pigment slurries produced by known methods form quite dense filter cakes and are difficult to filter but this disadvantage has been regarded as inherent in the production of a silica pigment for rubber reinforcing and like purposes. See Allen, U.S. Patent 2,924,510, dated Feb. 9, 1960. For example, a sample of wheel-cake of Hi-Sil 233 (a commercial rubber reinforcing silica having a reported dry solids content of 15.6%) as a wet silica pigment slurry exhibited the usual slow rate of filtration and washing corresponding to a filtration number of 75 as measured by standardized Test A, hereinafter described.

By the present invention, however, as shown by the examples hereinafter set forth, effective reinforcing pigments are produced, with the added advantage that as wet silica pigments they have filtration numbers determined by Test A of less than 30, preferably less than 20, and most preferably of less than 10, and thus can be filtered and washed in much less time than heretofore required. For comparison similar silica pigment slurries were prepared by the acidulation of aqueous sodium silicate solution with carbon dioxide by procedures other than those employed in the present invention, which involved the usual vigorous agitation, and these products had filtration rates corresponding to filtration numbers in the range of 70 to 115 (Test A).

Thus the present invention resides primarily in the discovery and disclosure of wet silica pigments which have susbtantially augmented filterability compared to those of the prior art, and in the discovery and disclosure of process improvements for producing the same, and in preferred embodiments of the latter.

As indicated in FIG. 1 of the drawing, known processes for preparing silica pigments involve two steps of processing:

(A) Sodium silicate is converted to wet silica pigment by acidulating it in aqueous solution, as by mixing the same with carbon dioxide. This procedure conventionally is effected with the vigorous agitation usually employed for effecting gas and liquid contact, e.g. by use of a turbo agitator or the like (see Thornhill, U.S. Patent 2,940,830; col. 5, line 46; col. 26, lines 16, 18, 35, and 40; col. 29, line 71; col. 32, line 53, etc.).

(B) The resulting wet silica pigment is then freed of eletcrolyte and/or alkalinity, after-treated, and recovered, which procedures conventionally involve one or more filtration steps; and as above noted, such filtration step or steps conventionally are time consuming operations since separating and washing of the wet silica pigment produced by the known processes is very slow, particularly where the pH of the slurry is below about 5. (See Allen U.S. Patent 2,924,510, col. 1, line 45.)

The present invention primarily resides in the discovery of a process in which in step (A) a wet silica pigment can be produced which has a novel structure such that it is filterable with greater ease and rapidity than those known to the art prior hereto, which impoved filterability may be quantitatively measured or evaluated in accordance with Standardized Test A as aforesaid. Secondarily the invention resides in the discovery of how to maintain this structure of improved filterability during the operations of transportation and handling prior to and during step (B) above.

Thus the invention primarily resides (1) in the discovery that the advantages of the invention are achieved by conducting step (A), contrary to the conventional modes of effecting gas and liquid contact, under conditions of mixing which avoid vigorous agitation and the shearing of the materials effected thereby to such an extent that, as disclosed by this invention, a wet silica pigment structure is produced which has a low filtration number (Test A) as aforesaid.

Secondly the invention resides in the discovery that by effecting any treatments of the resulting wet silica pigments prior to subjecting the same to filtration or equivalent steps, likewise under conditions which avoid vigorous agitation or shearing of the structures, the improved structure of the silica can be maintained.

The invention has additionally disclosed (3) that by the use of gas agitation with gas other than that absorbed by the solution in step (A), sufficient agitation can be obtained to effect adequate mixing therein while maintaining sufficiently low shear to achieve the primary objective of the invention; (4) that by effecting the mixing in step (A) with the aid of low shear stirring, e.g. by a slowly rotating stirring arm, or the like, as contrasted with the vigorous agitation with relatively high speed or high shear propellers, turboagitators or paddle stirrers employed by the prior art, sufficiently low shear may be maintained to achieve such objective; and (5) that such gas agitation and such low shear stirring may be employed concurrently in step (A) while still achieving the desired result.

Furthermore, the invention resides in the discovery (6) that by avoiding vigorous agitation and shear during reslurry or re-pulping of the wet silica pigment, and during the transportation thereof from step (A) to and through step (B), the new silica structure can be preserved so that its better filterability may be taken advantage of during step (B).

Also, the invention resides in the discovery (7) that its primary objective can be achieved to a substantial extent by applying the improvement in step (A) following first appearance of precipitate in the aqueous solution, and more especially following the appearance of a Tyndall effect therein, as well as throughout step (A). Finally, the invention resides in the provision of wet silica pigments having structures rendering them much more readily filterable than the wet silica pigments produced by the prior art processes, and clearly distinguished by their filtration number (Test A) from the wet silica pigments of the prior art.

The standardized test employed herein to measure the filterability of the product and distinguish it from the prior art products in terms of filtration number, is as follows:

*Test A—Filtration number (a standard measure of filterability)*

The filtration number of the wet silica pigment (Test A) is determined at room temperature (25° C.), with the aid of a Buechner funnel type filter having a 1/10 square foot filter area, using filter cloth, e.g. nylon filter cloth, in place of filter paper, and employing a vacuum of 25±2 inches of mercury, by a procedure comprising the following steps, which in accordance with the present invention are effected in a manner to subject the wet silica pigment to as little shear as possible:

(1) The slurry of wet silica pigment is adjusted to a concentration such that a 300-gram sample of the slurry contains 18±1 grams of the silica pigment (dry basis when dried to constant weight at a temperature between 105 and 200° C.), such silica having been washed to such extent that said sample has a resistivity of 1100±100 ohms/cm., as measured with a suitable conductivity bridge and a dipping type conductivity cell having a cell constant of 1.0 reciprocal centimeter.

(2) A 300 gram portion of the so prepared slurry is supplied to the 1/10 square foot filter leaf, the vacuum is applied thereto, and the time elapsing until the appearance of the first crack in the filter cake is measured. This time, expressed in minutes, is the filtration number, and identifies the rate of filterability of the wet silica pigment, which is a function of its structure.

Referring now to FIG. 2 of the drawings, there is illustrated therein an example of equipment suitable for the performance of step (A) and for the performance of step (B) when such step is applied to reslurried wet silica pigment. In this form the equipment comprises a reactor vessel 10 for holding the substantial volume 11 of solution being treated. The reactor preferably has a sloping bottom and means for withdrawing therefrom the wet silica pigment slurry from step (A) shown as a valved passage 12 which is connected to low shear transport equipment such as an air lift or low shear pump for delivering the slurry to the equipment used to practice step (B). When the equipment is used in step (B), the low shear transport equipment may deliver the reslurried silica pigment to the reactor 10 in any suitable way, e.g. via the same valved passage 12.

The carbon dioxide for reaction in step (A) is supplied to and distributed in the reactor 10 in any way which does not subject the solution to high shear. Thus in this form of equipment the high speed high shear turbo-agitator type of equipment usually employed for finely dividing a gas for intimate contact with a liquid is avoided, and in accordance with the present invention the carbon dioxide with or without other agitating gas, is introduced through gas inlet means preferably comprising a conduit 14 terminating in a nozzle or series of nozzles 15 which distribute or atomize the gas into the liquid throughout a considerable area thereof. When only sufficient carbon dioxide is supplied over the usual extended time to be absorbed by the sodium silicate solution to effect the reaction of step (A) this volume per unit of time is so small that any gas agitation accomplished thereby is negligible. By supplying with the reacting carbon dioxide a larger volume of gas which is not absorbed, or a quantity of air or air components, either through the same conduit 14 or separately, gas agitation may be provided to aid the low shear mixing. In addition to, or in lieu of, the use of means 14 for supply of agitating gas, low shear mixing means may be and preferably is provided shown as a slow speed stirrer 17 having a relatively narrow elongated stirrer arm or rod 18 and driven at a suitable slow speed by appropriate driving means 20. In a reactor of 3 foot inside diameter, an arm 18, which is 6 inches above the tank bottom and 2½ feet long by 1½ inches high in cross-section, and which is driven at 50 r.p.m., has been found to give sufficiently low shear stirring. The nozzles 15, as shown, preferably extend laterally from the pipe 14 in the direction in which the stirrer 18 urges the slurry. Means 21 for supplying water and means 22 for supplying aqueous sodium silicate are provided. Also means for supplying treating reagent, shown as a spray pipe 23, may be provided when other liquid materials are to be supplied as above set forth.

When pressure or vacuum is to be employed in after-treating or in effecting transport of materials, the reactor may be closed and may be provided with a further valved inlet and outlet means (not shown) for evacuation, pressurizing and relief purposes. When the reaction is to be effected at elevated temperatures, the reactor may be suitably heated, as by a steam coil or other heating means.

Bearing in mind the principal aspects of the invention above enumerated, and the illustrative equipment just described, the practice of the invention will be made clearly evident by the following examples of specific embodiments thereof, which examples, however, are illustrative and not restrictive of the invention. The examples numbered 1 to 4 illustrate the invention applied to the production of silica pigment suitable for rubber reinforcement by precipitation from aqueous sodium silicate solution with the aid of carbon dioxide under various conditions of acidulation, viz.: with and without the addition of non-acidulating electrolyte, at room temperature and elevated temperature, and with air and/or mechanical low shear agitation in the examples proper. With each of these examples is presented a comparative example prepared in the same way but subjected to vigorous agitation (intermediate shear) during the preparation thereof. Each example and comparative example as shown by Table VI hereinafter resulted in a wet silica pigment of the class which is precipitated from aqueous sodium silicate solution with the aid of carbon dioxide in the preparation of finely divided particulate silica pigment for the reinforcement of rubber, and each wet silica pigment product, when subjected to similar after-treatments, effected good rubber reinforcement. Distinctively, however, as shown by Table IV herein the wet silica pigments prepared in accordance with the present invention had structures improving their filterability four-fold or more compared to the corresponding wet silica pigments prepared with the usual vigorous agitation (intermediate shear), and compared to the filterability of a slurry of the Hi-Sil 233 wet silica pigment.

*Example 1.—Wet silica pigment with improved filterability prepared with the aid of gas agitation and low shear stirring*

A 270 gallon reactor equipped with a driven 50 r.p.m. low shear stirring arm as described in connection with FIG. 2, was charged with 143 kilograms of commercial 41° Bé. sodium silicate containing 200 moles of the composition expressed by the formula $Na_2O/(SiO_2)_{3.22}$ and diluted with 630 liters of water and this charge was heated to 80° C. While the solution was held at 80° C. gas from the combustion of propane in air, containing 9–11% carbon dioxide by volume was introduced at a relatively constant rate over a period of 790 minutes at which time the acidulation of the sodium silicate reached 125%. After 150 minutes of the acidulation the blue color of the Tyndall effect was noticeable and at this time 150 liters of water were added.

The wet silica pigment was filtered and washed until the filtrate had a resistivity of 1120 ohms/cm. and this wet silica pigment which had been observed to have improved filterability, was designated silica 1.

To a portion of the silica 1 was added 10% sulfuric acid until the silica slurry had a pH of 4.0. This acidified silica product which had been transported and treated without subjecting it to any vigorous agitation, was filtered and washed, as readily as before, and was dried at 105° C., micropulverized and designated silica 1–A, and was found to be a good reinforcing pigment for rubber as is hereinafter set forth.

*Example 2.—Wet silica pigment with improved filterability prepared with the aid of low shear stirring*

Into a precipitator vessel equipped with a low speed low shear stirrer as aforesaid was charged 2790 grams of a commercial 41° Bé. sodium silicate containing 4 moles of sodium silicate of the composition expressed by the formula $Na_2O/(SiO_2)_{3.22}$ diluted with 14 liters of water. To the said sodium silicate solution at 25° C. being only mildly agitated was added concurrently carbon dioxide and electrolyte and the rates of addition of these materials are set forth in Table I hereof.

TABLE I.—CUMULATIVE RATES OF EXAMPLE 2

| Time, minutes (Cumulative) | Sodium Carbonate, moles (Cumulative) | $CO_2$, moles (Cumulative) |
|---|---|---|
| 0 | 0 | 0 |
| 70 | 1 | 0.35 |
| 145 | 2 | 0.60 |
| 220 | 3 | 0.95 |
| 295 | 4 | 1.20 |
| 420 | ------- | 1.70 |
| 490 | ------- | 2.00 |
| 600 | ------- | 4.00 |
| 620 | ------- | 4.25 |

This wet silica pigment was filtered and washed until the filtrate had a resistivity of 1035 ohms/cm., again being observed to filter well, and was designated silica 2.

To a portion of this silica 2 was added 10% sulfuric acid until the silica slurry had a pH of 4.0. This acidified silica product which was not subjected to any vigorous agitation, filtered and washed readily, and was dried at 105° C., micropulverized and designated silica 2–A, and was shown to be a good rubber reinforcing pigment as hereinafter set forth.

*Example 3.—Wet silica pigment with improved filterability prepared with the aid of gas agitation*

Into a stainless steel reactor was charged 13,950 grams of commercial 41° Bé. sodium silicate containing 20 moles of sodium silicate of the composition expressed by the formula $Na_2O/(SiO_2)_{3.22}$ diluted with 70 liters of water, to which was added 2120 grams of sodium carbonate dissolved in 20 liters of water. The reactor was arranged by partitioning to provide an upflow chamber and a downflow chamber inter-communicating at top and bottom. Gas agitation and circulatory mixing were effected by introduction of air into the bottom of the reactor in underlying relation to the upflow chamber in sufficient quantity to promote a reasonably rapid circulation and thorough mixing of the material, and the carbon dioxide was introduced into the bottom of the reactor in underlying relation to the downflow chamber, the rate of introduction of the agitating gas being adjusted so that the carbon dioxide could rise countercurrent to the down flowing liquid. During the acidulation with carbon dioxide the temperature was maintained at 25° C. and the acidulation rate is set forth in Table II hereof.

TABLE II

| Time, hours (Cumulative) | $CO_2$, moles (Cumulative) | Acidulation, percent (Cumulative) |
|---|---|---|
| 9.5 | 6.6 | 33 |
| 13.25 | 12.5 | 62.4 |
| 16.25 | 14.2 | 71.2 |
| 28 | 25.2 | 126 |
| 35 | 31.2 | 156 |

This wet silica pigment was filtered and washed until the filtrate had a resistivity of 1060 ohms/cm., and was observed to have filtered readily, and was designated silica 3.

To a portion of this silica 3 was added 10% sulfuric acid until the silica slurry had a pH of 4.0. This acidified silica product was filtered and washed, again quite readily as it was not subjected to vigorous agitation, dried at 105° C., micropulverized and designated silica 3–A, and was shown to be a rubber reinforcing pigment by compounding and testing as hereinafter set forth.

*Example 4.—Wet silica pigment with improved filterability prepared with the aid of gas agitation*

Into the stainless steel reactor employed in Example 3 was charged 13,850 grams of commercial 41° Bé. sodium silicate containing 20 moles of sodium silicate of the composition expressed by the formula $Na_2O/(SiO_2)_{3.22}$ diluted with 63 liters of water, to which charge was added 1160 grams of sodium chloride dissolved in 15 liters of water. The gas agitation and acidulation were effected in the same manner as in Example 3, no mechanical agitator being used.

TABLE III

| Time, hours (Cumulative) | $CO_2$, moles (Cumulative) | Acidulation, Percent (Cumulative) |
|---|---|---|
| 18.75 | 8.4 | 42 |
| 20.5 | 17.0 | 85 |
| 24 | 18.8 | 94 |
| 32 | 24.6 | 123 |
| 40 | 28.6 | 143 |

The wet silica pigment was also filtered and washed until the filtrate had a resistivity of 1040 ohms/cm., again exhibited ready filterability, and was designated silica 4.

To a portion of this silica 4 was added 10% sulfuric acid until the silica slurry had a pH of 4.0. This acidified silica product was filtered and washed, again without subjecting it to vigorous agitation, dried at 105° C., micropulverized and designated silica 4–A, which likewise was shown to be a rubber reinforcing pigment as set forth hereinafter.

In this Example 4, as well as in the embodiments of Examples 1, 2, and 3 it is generally desirable to use the gas agitation and/or the low shear stirring throughout step (A). However, in other embodiments the low shear agitation may be employed following the appearance of the Tyndall effect, and certain advantages of the invention may still be obtained even if vigorous agitation is employed during that part of the acidulation preceding the appearance of the Tyndall effect. In particular it is important that the invention be practiced following the appearance of precipitate in the aqueous solution, if benefits of the invention are to be achieved.

Examples 5-8.—Comparative examples

The wet silica pigments of Examples 1, 2, 3, and 4, during the filtration and washing thereof as above noted exhibited marked improvement in filterability compared to wet silica pigment which had been previously prepared under vigorous agitation involving the accompanying intermediate values of shear. In order to evaluate and afford a ready means for testing the order of improvement effected by the present invention, comparative examples were prepared in the same manner as Examples 1, 2, 3 and 4 respectively except that they were prepared with vigorous agitation involving intermediate shear, and were designated respectively as Examples 5 through 8. Examples 1 to 4 and 5-8 were then subjected to the Standard Filterability Test A hereinbefore set forth.

Comparison of the Standard Filterability Test results obtained is set forth in Table IV and conservatively illustrates the order of improvement effected by the present invention. The tabulation of the filtration numbers of the foregoing examples shows that in the examples prepared in accordance with the present invention, the filterability as compared to the comparison Examples 5 to 8, was improved from about four fold to about twelve fold by the practice of the present invention.

TABLE IV.—TABULATION OF STANDARD TEST DATA SHOWING ADVANTAGE OF INVENTION

| Example No. | Filtration Number (Test A) | | Order of Improvement in Filterability |
|---|---|---|---|
| | Prepared with low shear mixing per present invention | Prepared with vigorous agitation (intermediate shear) for comparison | |
| 1 | 7.7 | | } 10 to 1. |
| 5 | | 74 | |
| 2 | 9.9 | | } 12 to 1. |
| 6 | | 115 | |
| 3 | 16.2 | | } 4 to 1. |
| 7 | | 72 | |
| 4 | 18.7 | | } 6 to 1. |
| 8 | | 112 | |

This tabulation (Table IV) and the details of the examples hereinabove set forth also show that while selection of conditions during the acidulation step (A) other than the conditions with which the present invention is particularly concerned, does not interfere with the improvement of filterability by the present invention, it does effect the absolute values of filtration number obtained. Hence it will be apparent that the filtration numbers set forth in Table IV column 2, do not necessarily represent the ultimate improvement which may be obtained by the invention.

Examples 9-12.—Testing of vulcanizates

The silicas 1-A, 2-A, 3-A, and 4-A above, were each compounded with SBR-1502 in accordance with the compounding recipe given in Table V.

TABLE V

| Compound ingredients: | Quantities (wt. parts) |
|---|---|
| Butadiene-styrene copolymer (SBR-1502) | 100 |
| Silica pigment material | 50 |
| Antioxidant 2,2-methylene-bis(4-methyl-6-t.-butylphenol) (Antioxidant 2246) | 2.0 |
| Triethanolamine | 1.0 |
| Paracoumarone-indene resin (Cumar MH 2½) | 2.5 |
| Reogen | 5.0 |
| Zinc oxide | 5.0 |
| Magnesium oxide | 4.0 |
| Di-2-benzothiazyl disulphide (Altax) | 0.75 |
| N,N'-di-o-tolylguanidine (DOTG) | 1.5 |
| Sulfur | 2.0 |

In compounding the stock the selected silica pigment material was milled into the SBR-1502 together with the antioxidant and other compounding ingredients and the stock was aged overnight and then remilled and cured for 120 minutes at 287° F.

The vulcanizates were then tested and the physical properties thereof were determined as set forth in Table VI, Examples 9-12. Also similarly compounded Hi-Sil 233 was similarly tested and the physical properties of the vulcanizate are also set forth in Table VI for comparison.

TABLE VI—REINFORCING SILICA PIGMENTS IN VULCANIZATES

| Example No. | Silica No. | Hardness (Shore A) | Modulus (300%, p.s.i.) | Tensile (Ult., p.s.i.) | Elong. (percent) |
|---|---|---|---|---|---|
| 9 | 1-A | 58 | 625 | 3,600 | 685 |
| 10 | 2-A | 78 | 1,365 | 4,690 | 665 |
| 11 | 3-A | 73 | 1,570 | 4,225 | 570 |
| 12 | 4-A | 79 | 1,005 | 4,680 | 700 |
| 13 | Hi-Sil 233 | 57 | 560 | 3,530 | 700 |

These tests of the vulcanizates demonstrated clearly that the wet silica pigments 1, 2, 3, and 4, had the characteristics required for the preparation of finely divided particulate silica pigment suitable for the renforcement of rubber, notwithstanding the fact that they had been prepared in such a manner as to substantially improve the filterability thereof.

The present invention may be applied in the acidulation of alkali metal silicate solutions having concentrations of alkali metal silicate—designated by the formula $M_2O(SiO_2)_x$ in which M is alkali metal—in the range of about 20 grams per liter to about 200 grams per liter, and being subjected to acidulation at temperatures between the freezing point and boiling point of water, i.e., from about 5° C. to about 100° C. at atmospheric pressure, or up to 200° C. or more if conducted under higher pressures.

The rate of introduction of the carbon dioxide gas establishes the rate of acidulation of the sodium silicate and this rate may vary from the maximum rate of absorption of carbon dioxide by the sodium silicate solution to rates one-tenth or even as slow as one-hundredth of this maximum absorption rate. Copending Patent No. 3,250,594 and application Ser. No. 422,454 disclose the advantages of varying the rate of acidulation of sodium silicate with carbon dioxide and/or of varying the concentration of non-acidulating electrolyte during certain stages of the acidulation and these procedures can be employed in conjunction with the teachings of this invention.

The process of this invention may be conducted in a batchwise or stepwise manner, or continuously, depending on available equipment.

In the examples herein, like after-treatments are employed in each of the examples of the respective series set out to exemplify the invention and its advantages, but the particular after-treatments are not claimed herein, and the novel ones thereof are claimed in other applications.

The silica product as wet filter or centrifuge cake may be master-batched with latices of natural or synthetic elastomers and/or plastomers.

The silica pigments contemplated herein are at least for the most part comprised of silica. They usually comprise a few percent of free water removable by heating at 106° C. and a few percent of bound water removable by heating at over 1000° C. They may contain a small amount of bound alkali. They may also contain a small amount of metal in the form of oxide, hydroxide, silicate or other salts, especially metal of the group consisting of magnesium, calcium, barium, zinc and aluminum. These and other metallo-ingredients of the silica pigments may be introduced, for example, as described in Burke et al., U.S. Patent No. 3,178,388 dated April 13, 1965, and in copending Burke et al. application Ser. No. 422,455, filed Dec. 30, 1964, now abandoned. Thus the term silica pigment contemplates not only the pigments comprised solely of $SiO_2$ but also the siliceous pigments containing proportions of other constituents as just described.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalence of the claims are intended to be included therein.

I claim:
1. In a process for preparing a silica pigment which includes the steps of
   (a) mixing an aqueous sodium silicate solution and carbon dioxide to form a slurry of wet silica pigment, and
   (b) subjecting the said slurry to after treatment including filtering,
   the improvement which comprises:
   (c) conducting at least the latter part of the mixing in step (a) under conditions of shear essentially as low as that produced by rotation at 50 r.p.m. in a reactor of 3 foot inside diameter, of an agitating arm which is 6 inches above the bottom of the reactor and 2½ feet long by 1½ inches high in cross section, whereby there is produced a wet silica pigment of a structure having a filtration number less than 30 as measured by standard Test A set forth in the foregoing specification.

2. The invention defined in claim 1, wherein the mixing according to step (c) is effected with the aid of gas agitation by gas other than that absorbed in step (a).

3. The invention defined in claim 1, wherein the mixing according to step (c) is effected with the aid of mechanical stirring.

4. The invention defined in claim 1, wherein the mixing according to step (c) is effected with the aid of mechanical stirring and gas agitation by gas other than that absorbed in step (a).

5. The invention defined in claim 1, wherein step (c) is performed throughout that part of step (a) following the appearance of precipitate in the aqueous solution.

6. The invention defined in claim 1, wherein step (c) is performed throughout that part of step (a) following the appearance of Tyndall effect in the aqueous solution.

7. The invention defined in claim 1, wherein step (c) is performed throughout step (a).

8. In a process for preparing silica pigment which includes the steps of
   (a) mixing an aqueous sodium silicate solution and carbon dioxide to form a slurry of silica pigment, and
   (b) separating water from said slurry,
   the improvement which comprises
   (c) conducting at least the latter part of the mixing in step (a) under conditions of shear essentially as low as that produced by rotation at 50 r.p.m. in a reactor of 3 foot inside diameter, of an agitating arm which is 6 inches above the bottom of the reactor and 2½ feet long by 1½ inches high in cross section, whereby there is produced a wet silica pigment of a structure having a filtration number less than 30 as measured by Standard Test A set forth in the foregoing specification, and
   (d) subjecting said slurry to step (b).

9. A wet silica pigment having a filtration number less than 30 as measured by standard Test A set forth in the foregoing specification, said wet silica pigment having been produced by a process which includes the steps of
   (a) mixing an aqueous alkali metal silicate solution and carbon dioxide to form a slurry of wet silica pigment, and
   (b) conducting at least the latter part of the mixing in step (a) under conditions of low shear agitation.

References Cited

UNITED STATES PATENTS

| | | | |
|---|---|---|---|
| 2,863,727 | 12/1958 | Thornhill et al. | 23—182 |
| 2,956,957 | 10/1960 | Armstrong et al. | 252—313 |
| 3,235,331 | 2/1966 | Naurouth et al. | 23—182 |
| 3,256,068 | 6/1966 | Burke et al. | 23—182 X |

OTHER REFERENCES

Chem. Engineers Handbook, J. Perry, editor; 3rd edition TP 155 P4 (1950), page 1215, column 2 relied on.

OSCAR R. VERTIZ, *Primary Examiner.*

MILTON WEISSMAN, *Examiner.*

A. GREIF, *Assistant Examiner.*